United States Patent
Wu et al.

(10) Patent No.: US 7,580,252 B2
(45) Date of Patent: Aug. 25, 2009

(54) DISK DRIVE ASSEMBLY WITH MOUNTING BRACKET

(75) Inventors: Chia-Kang Wu, Taipei Hsien (TW); Chieh Yang, Taipei Hsien (TW); Yi-Lung Chou, Taipei Hsien (TW); Li-Ping Chen, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 52 days.

(21) Appl. No.: 11/838,243

(22) Filed: Aug. 14, 2007

(65) Prior Publication Data

US 2008/0239653 A1 Oct. 2, 2008

(30) Foreign Application Priority Data

Mar. 26, 2007 (TW) .............................. 96204821 U

(51) Int. Cl.
*H05K 5/00* (2006.01)
*H05K 7/00* (2006.01)
(52) U.S. Cl. .............................. 361/679.33; 361/679.31
(58) Field of Classification Search ................. 361/685, 361/679.31, 679.33
See application file for complete search history.

(56) References Cited

U.S. PATENT DOCUMENTS

| 4,894,739 | A  | * | 1/1990  | Kobayashi | 360/97.02 |
| 5,515,515 | A  | * | 5/1996  | Kennedy et al. | 710/302 |
| 5,673,172 | A  | * | 9/1997  | Hastings et al. | 361/685 |
| 5,886,869 | A  | * | 3/1999  | Fussell et al. | 361/685 |
| 6,478,390 | B2 | * | 11/2002 | Gan | 312/223.2 |
| 6,560,099 | B1 | * | 5/2003  | Chang | 361/685 |
| 2006/0133030 | A1 | * | 6/2006 | Takahashi et al. | 361/685 |

* cited by examiner

*Primary Examiner*—Jayprakash N Gandhi
*Assistant Examiner*—Anthony M Haughton
(74) *Attorney, Agent, or Firm*—Frank R. Niranjan

(57) ABSTRACT

A disk drive assembly is mounting in an enclosure (1). The enclosure has a bar (12). The disk drive includes a disk drive (4), a mounting bracket (2), and a converter card (3). The disk drive has a top surface (41), opposite side surfaces (43) and a back surface (45) perpendicular to the top surface. The disk drive has a first output connector on the back surface. The mounting bracket has a pair of feet (248) attached to the side surfaces of the disk drive and a mounting board (22) attached to the back surface of the disk drive. A resilient arm (5) with a protrusion (53) is formed on the resilient arm for engaging with the bar. The converter card is received in the mounting bracket, the converter card has a circuit board (31) parallel to the top surface of the disk drive.

8 Claims, 5 Drawing Sheets

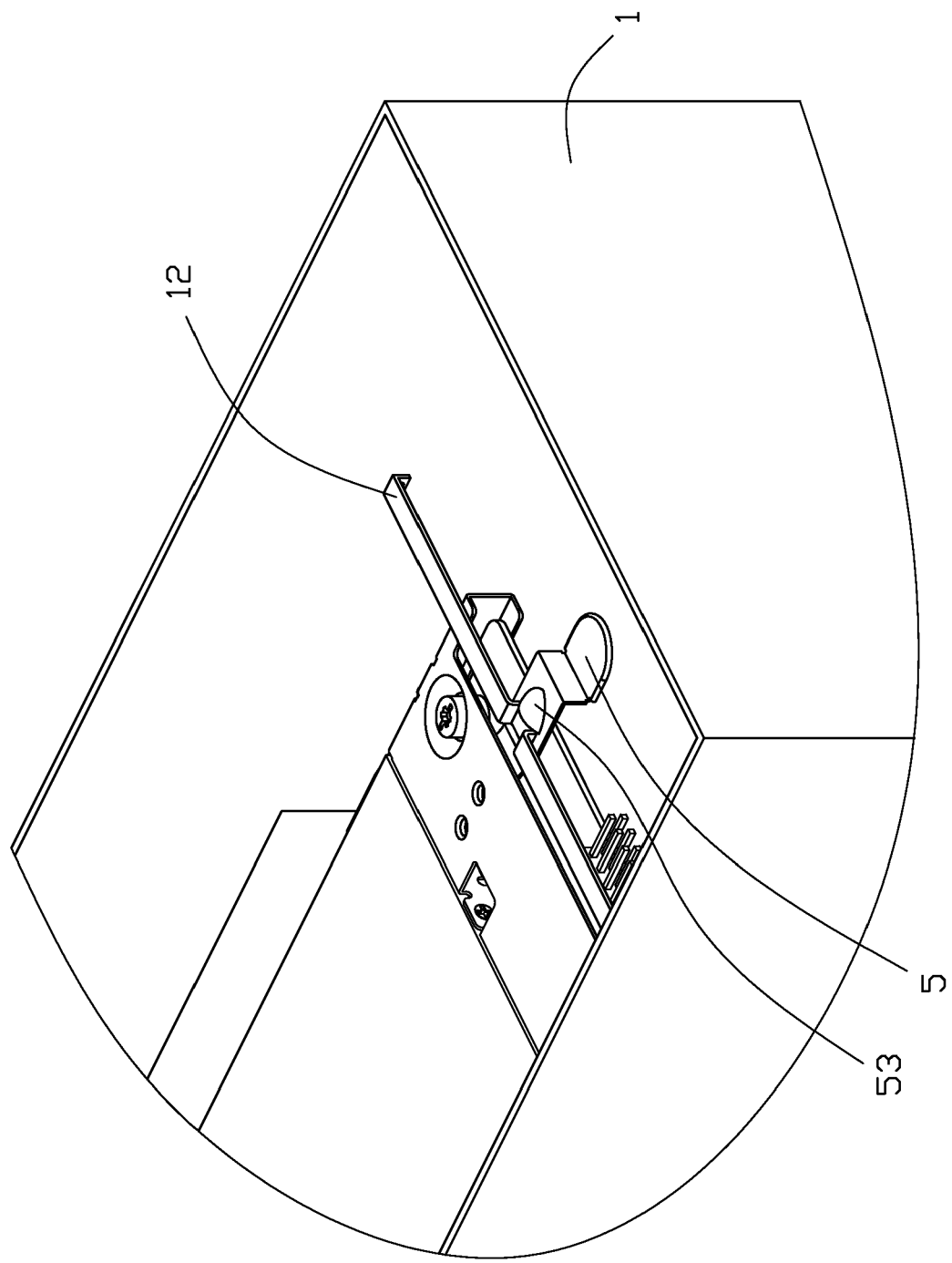

DISK DRIVE ASSEMBLY WITH MOUNTING BRACKET

BACKGROUND

1. Field of the Invention

The present invention relates to a disk drive assembly, particularly to a slim-type disk drive assembly with mounting bracket for a converter card.

2. Description of Related Art

Slim-type disk drive known for its thinness is commonly used in compact computers, such as a notebook computer, or even some kinds of servers. The slim-type disk drive may be an ODD (optical disk drive) or a HDD (Hard disk drive). Typically, a thickness of a slim-type ODD is in a range from 12.7 mm to 9.5 mm. Most of slim-type disk drives have unique output connecters, which cannot communicate with other electronic components directly within a computer. Thus, a converter card is used for connecting the output connector of a slim-type disk drive to other electronic components.

The traditional converter card is mounted to a slim-type disk drive directly with one or more screws. However, the converter card being thin and fragile, is at risk of being damaged during installation or during the installation of other nearby parts in the computer.

What is needed, therefore, is disk drive with a mounting bracket, which can protect a converter card within a computer enclosure from damage during installation procedures.

SUMMARY

A disk drive assembly is mounting in an enclosure. The enclosure has a bar. The disk drive includes a disk drive, a mounting bracket, and a converter card. The disk drive has a top surface, opposite side surfaces and a back surface perpendicular to the top surface. The disk drive has a first output connector on the back surface. The mounting bracket has a pair of feet attached to the side surfaces of the disk drive and a mounting board attached to the back surface of the disk drive. A resilient arm with a protrusion is formed on the resilient arm for engaging with the bar. The converter card is received in the mounting bracket, the converter card has a circuit board parallel to the top surface of the disk drive.

Other advantages and novel features of the present invention will become more apparent from the following detailed description of a preferred embodiment when taken in conjunction with the accompanying drawings, in which:

BRIEF DESCRIPTION OF THE DRAWINGS

FIG. 5 is a partial, assembled view of the disk drive assembly within a computer enclosure.

DETAILED DESCRIPTION OF THE EMBODIMENT

Figure 1:
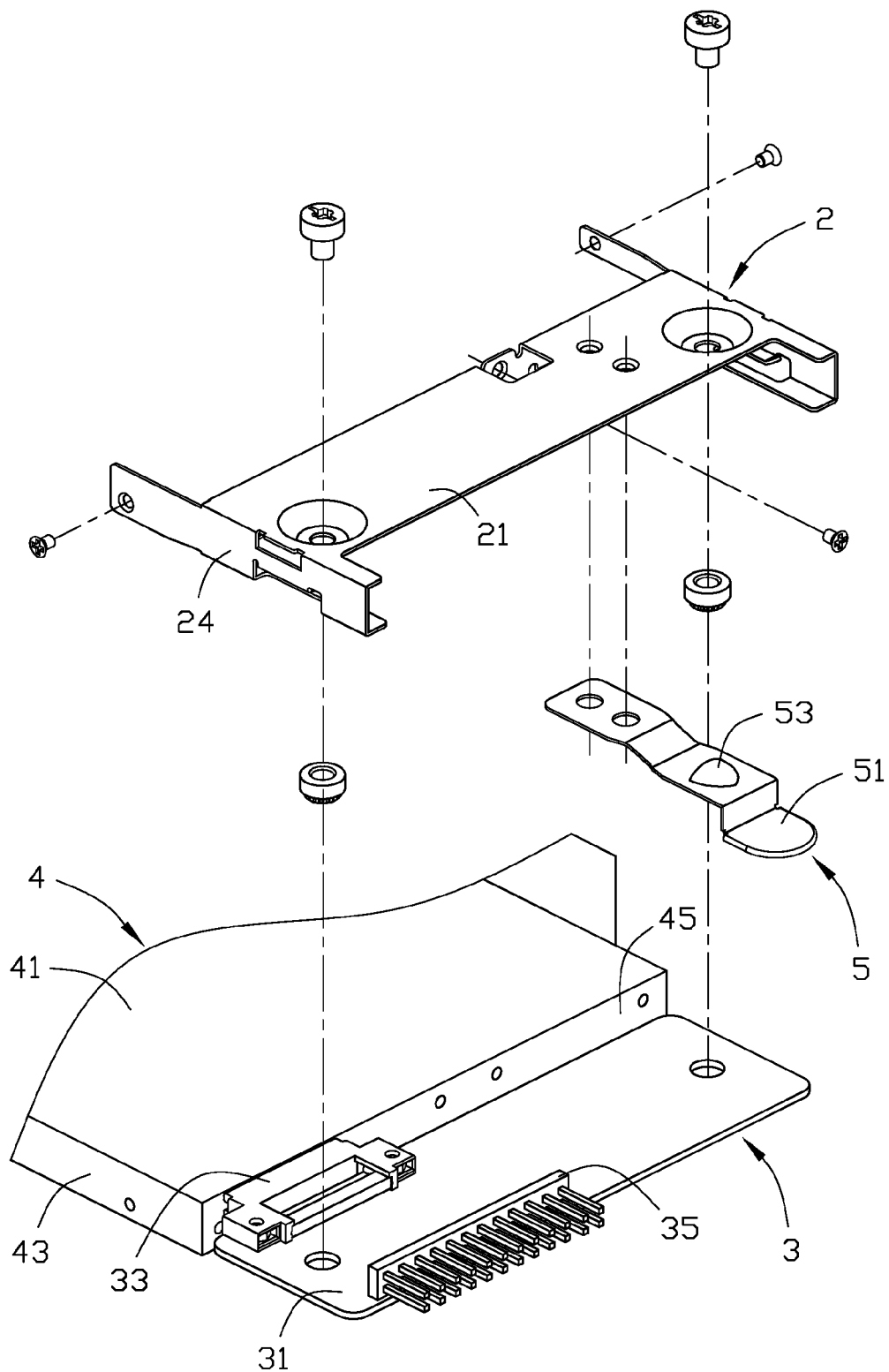
FIG. 1 is a partially exploded, isometric view of a disk drive assembly according to a preferred embodiment of the present invention, the disk drive assembly including a disk drive, a converter card attached to the disk drive, and a mounting bracket.

Referring to FIG. 1, a disk drive assembly includes a disk drive 4, a converter card 3, and a mounting bracket 2 for mounting the converter card 3 to the disk drive 4. The disk drive assembly can be slidably retained in a computer enclosure 1 (shown in FIG. 4).

The disk drive 4 includes a top surface 41, a pair of opposite side surfaces 43, and a back surface 45 formed perpendicular to the top surface 41. A disk drive output connecter is formed on the back surface 45.

The converter card 3 has a printed circuit board 31. An input connecter 33 and a standard output connecter 35 are set on the circuit board 31 so that a data signal output from the disk drive 4 can be transmitted to the converter card 3 and output from the standard output connecter 35 to a motherboard in the computer enclosure 1.

Figure 2:
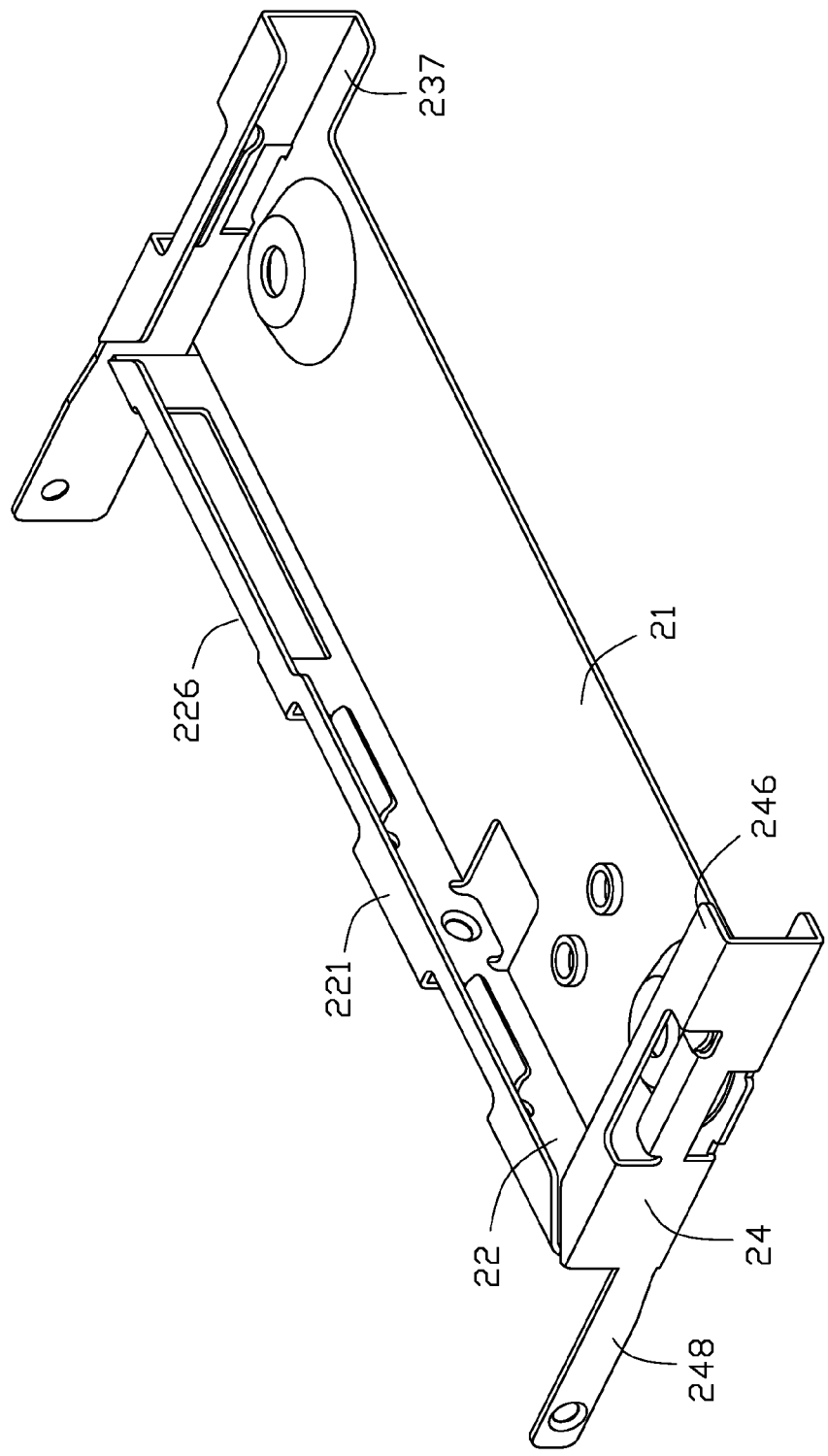
FIG. 2 is a partial, enlarged, isometric view of the mounting bracket of FIG. 1.
Figure 3:
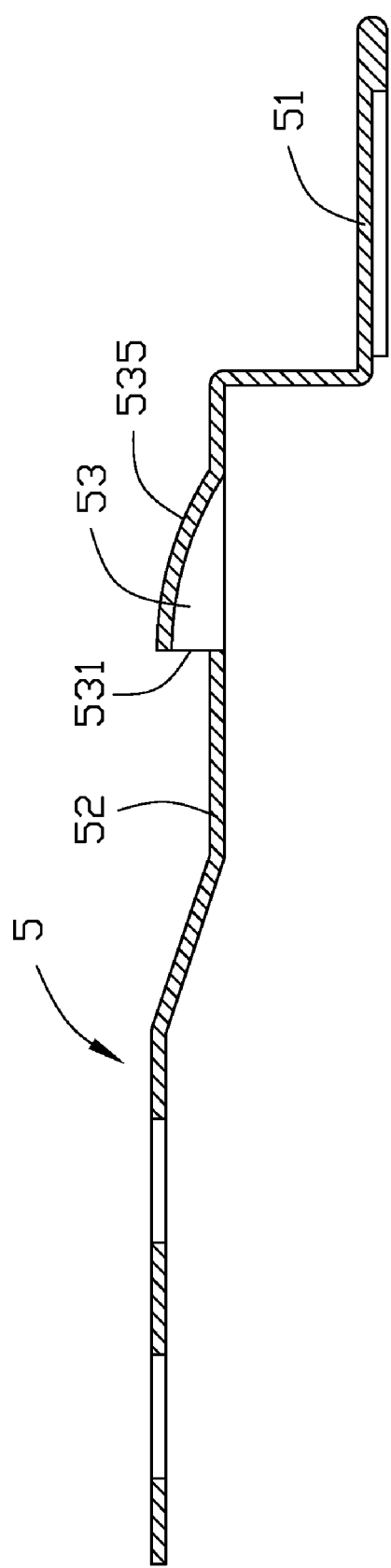
FIG. 3 is an enlarged, sectional view of a resilient arm of the mounting bracket of FIG. 1.

Referring also to FIG. 2 and FIG. 3, the mounting bracket 2 has a flat body 21. A mounting board 22 and a pair of side flanges 24 are perpendicularly formed on the flat body 21. The mounting board 22 has a rim 221 for holding the converter card 3. An opening 226 is defined in the mounting board 22 corresponding to the disk drive output connecter. Each side flange 24 has a guiding rail 246 for guiding in the converter card 3. A foot 248 extends from each side flange 24 for mounting to each side surface 43 of the disk drive 4. A resilient arm 5 is riveted to the flat body 21. The resilient arm 5 has a flat portion 52 and an operating portion 51. A protrusion 53 with a vertical engaging portion 531 and a slanted directing portion 535 is formed on the flat portion 52. A thickness of the mounting bracket 2 is not greater than a thickness of the disk drive 4.

Referring also to FIG. 5, a bar 12 is formed in the computer enclosure 1 in a direction perpendicular to a sliding direction of the disk drive assembly and positioned to allow a middle portion thereof to engage with the protrusion 53.

Figure 4:
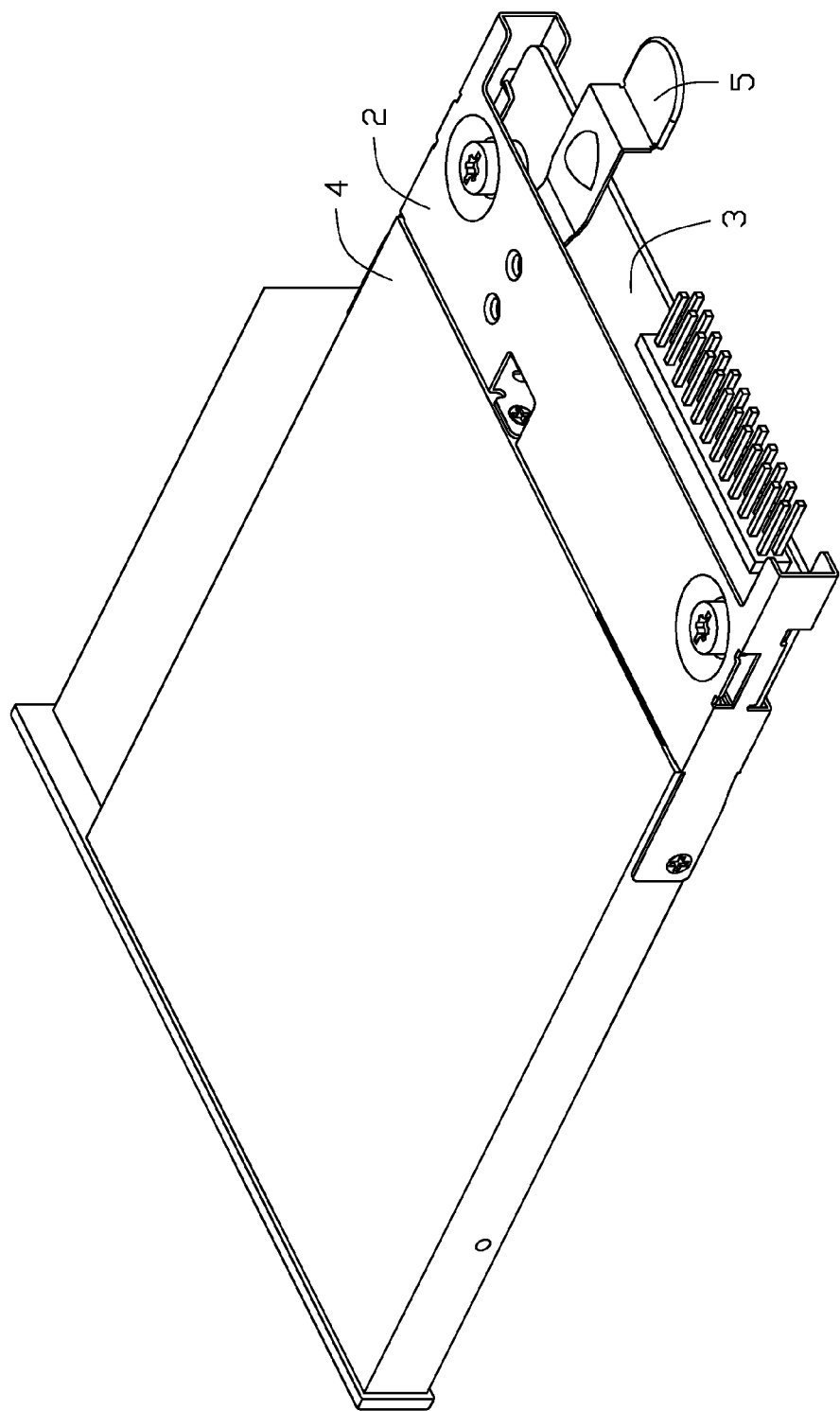
FIG. 4 is an isometric, assembled view of FIG. 1.

Referring to FIG. 4 and FIG. 5, when assembling the disk drive assembly, the mounting bracket 2 is first mounted to the disk drive 4 with the mounting board 22 screwed to the back surface 45 of the disk drive 4 and each foot 248 screwed to the side surfaces 43 thereof. The converter card 3 is moved into the mounting bracket 2 and the input connecter 33 connected to the disk drive output connecter. The converter card 3 is then screwed to the flat body 21 of the mounting bracket 2 with a pair of screws. The mounting bracket 2 with the convener card 3 is absolutely positioned at a back side of the disk drive 4 adjacent to the back surface 45 of the disk drive 4.

When installing the disk drive assembly in the computer enclosure 1, the disk drive assembly is first slid into the computer enclosure 1. The directing portion 535 of the protrusion 53 resists against the bar 12 causing the arm 5 to be resiliently bent down. When the disk drive assembly is totally slid into computer enclosure 1, the arm 5 rebounds and the vertical engaging portion 531 of the protrusion 53 is blocked by the bar 12. Thus, the disk drive assembly is securely retained in the computer enclosure 1. To remove the disk drive assembly from the computer enclosure 1, the operating portion 51 is pressed down resiliently bending the arm 5 and disengaging the protrusion 53 from the bar 12. While the arm 5 is bent, the disk drive assembly is slid out of the computer enclosure 1.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A disk drive assembly for mounting in an enclosure, the enclosure having a bar arranged therein, the disk drive assembly comprising:
    a disk drive having a top surface, opposite side surfaces and a back surface perpendicular to the top surface, the disk drive having a first output connecter provided on the back surface;
    a mounting bracket having a pair of side flanges and a mounting board attached to the back surface of the disk drive, a guiding rail formed on each side flange, a foot extending from each of the guiding rails to attach to a corresponding one of the side surfaces of the disk drive, and a resilient arm with a protrusion formed thereon for engaging with the bar; and
    a converter card received between the guiding rails of the mounting bracket, the converter card having a circuit board parallel to the top surface of the disk drive, an input connecter formed on the circuit board and connected to the first output connecter, and a second output connecter formed on the circuit board for connecting to a data signal cable, wherein the mounting bracket with the converter card is absolutely positioned at a back side of the disk drive adjacent to the back surface of the disk drive.

2. The disk drive assembly as described in claim 1, wherein the resilient arm has a flat portion with the protrusion formed thereon, the protrusion has a first side surface substantially perpendicular to the flat portion and a second side surface slopes down in a direction away from the disk drive; the first side surface faces toward the disk drive for engagement with the bar.

3. The disk drive assembly as described in claim 1, wherein the mounting bracket has a flat body parallel to the top surface of the disk drive for mounting the converter card thereto.

4. The disk drive assembly as described in claim 1, wherein a thickness of the mounting bracket is not larger than a thickness of the disk drive.

5. An electronic device comprising:
    an enclosure having a bar;
    a disk drive mounted in the enclosure, the disk drive having a top surface, a back surface perpendicular to the top surface, and a first output connecter on the back surface;
    a mounting bracket attached to the disk drive adjacent to the back surface thereof, the mounting bracket comprising a flat body, and a resilient arm attached to the body, the resilient arm being engaged with the bar such that the disk drive is blocked from moving toward the bar in the enclosure, the resilient arm being manually bendable so as to disengage from the bar, a height of the mounting bracket is not greater than a thickness of the disk drive; and
    a converter card having an input connecter connected to the first output connecter, and a second output connecter for connecting to a motherboard in the enclosure.

6. The electronic device assembly as described in claim 5, wherein the resilient arm has a flat portion with the protrusion formed thereon, a protrusion is formed on the resilient arm, the protrusion has a first side surface substantially perpendicular to the flat portion and a second side surface slopes down in a direction away from the disk drive; the first side surface faces toward the disk drive for engagement with the bar.

7. The electronic device assembly as described in claim 5, wherein the mounting bracket has a pair of side flanges formed on opposite edges of the flat body, and each side flange has a guiding rail for receiving the converter card therein.

8. The electronic device assembly as described in claim 5, wherein the mounting bracket has a pair of feet attached to opposite sides of the disk drive.

* * * * *